(12) United States Patent
Cloutier

(10) Patent No.: US 7,817,275 B2  
(45) Date of Patent: Oct. 19, 2010

(54) SCANNING OPTICAL MICROSCOPE WITH LONG WORKING DISTANCE OBJECTIVE

(75) Inventor: Sylvain G. Cloutier, Newark, DE (US)

(73) Assignee: University of Delaware, Newark, DE (US)

( * ) Notice: Subject to any disclaimer, the term of this patent is extended or adjusted under 35 U.S.C. 154(b) by 223 days.

(21) Appl. No.: 12/044,370

(22) Filed: Mar. 7, 2008

(65) Prior Publication Data

US 2008/0218756 A1     Sep. 11, 2008

Related U.S. Application Data

(60) Provisional application No. 60/905,408, filed on Mar. 7, 2007.

(51) Int. Cl.  
*G01N 21/00* (2006.01)

(52) U.S. Cl. .................. 356/432; 356/434

(58) Field of Classification Search .......... 356/432–444  
See application file for complete search history.

(56) References Cited

U.S. PATENT DOCUMENTS

| | | | | |
|---|---|---|---|---|
| 4,589,742 A * | 5/1986 | Schindl | ............ | 359/513 |
| 5,035,476 A * | 7/1991 | Ellis et al. | ............ | 359/202.1 |
| 5,112,125 A | 5/1992 | Neumann | | |
| 5,296,703 A * | 3/1994 | Tsien | ............ | 250/235 |
| 5,386,112 A * | 1/1995 | Dixon | ............ | 250/234 |
| 5,532,873 A * | 7/1996 | Dixon | ............ | 359/388 |
| 5,535,052 A * | 7/1996 | Jorgens | ............ | 359/388 |
| 5,557,452 A * | 9/1996 | Harris | ............ | 359/368 |
| 5,691,839 A * | 11/1997 | Kobayashi | ............ | 359/385 |
| 5,724,131 A | 3/1998 | Chim et al. | | |
| 5,760,951 A * | 6/1998 | Dixon et al. | ............ | 359/385 |
| 5,764,364 A | 6/1998 | Bruck | | |
| 5,981,956 A * | 11/1999 | Stern | ............ | 506/35 |
| 6,043,882 A * | 3/2000 | De Wolf et al. | ............ | 356/326 |
| 6,134,002 A * | 10/2000 | Stimson et al. | ............ | 356/326 |
| 6,943,332 B2 | 9/2005 | Suzuki | | |
| 6,963,398 B2 * | 11/2005 | Sasaki et al. | ............ | 356/318 |
| 7,015,485 B2 | 3/2006 | Kitagawa | | |
| 7,034,271 B1 * | 4/2006 | Sinclair et al. | ............ | 250/201.3 |
| 7,053,351 B2 | 5/2006 | Li et al. | | |
| 7,088,517 B2 | 8/2006 | Spiecker | | |

\* cited by examiner

*Primary Examiner*—Gregory J Toatley, Jr.  
*Assistant Examiner*—Jarreas C Underwood  
(74) *Attorney, Agent, or Firm*—RatnerPrestia

(57) ABSTRACT

A scanning optical microscope, including: a light source to generate a beam of probe light; collimation optics to substantially collimate the probe beam; a probe-result beamsplitter; a long working-distance, infinity-corrected objective; scanning means to scan a beam spot of the focused probe beam on or within a sample; relay optics; and a detector. The collimation optics are disposed in the probe beam. The probe-result beamsplitter is arranged in the optical paths of the probe beam and the resultant light from the sample. The beamsplitter reflects the probe beam into the objective and transmits resultant light. The long working-distance, infinity-corrected objective is also arranged in the optical paths of the probe beam and the resultant light. It focuses the reflected probe beam onto the sample, and collects and substantially collimates the resultant light. The relay optics are arranged to relay the transmitted resultant light from the beamsplitter to the detector.

29 Claims, 4 Drawing Sheets

SCANNING OPTICAL MICROSCOPE WITH LONG WORKING DISTANCE OBJECTIVE

The U.S. Government has a paid-up license in the present invention and the right in limited circumstances to require the patent owner to license others on reasonable terms as provided for by contract as awarded by the Department of Energy under funding number DE-FG02-06CH11383.

FIELD OF THE INVENTION

The present invention concerns laser microscopy systems. In particular, these laser microscopy systems may be used for improved high-resolution laser micro-spectroscopy analysis of samples mounted in hot, cold, high-pressure, vacuum, fluidic, gas discharge, or electrochemistry chambers, for example.

BACKGROUND OF THE INVENTION

Conventionally, a scanning laser microscope has been well known as an apparatus for illuminating a specimen (sample) with a light beam from a light source for two-dimensional scanning, detecting a light from the specimen using a photodetector, converting the detected light into an electric signal by a photoelectric transducer, and obtaining image data.

Briefly described below are the configuration and the operation of a prior art scanning laser microscope.

A specimen is illuminated with a light beam from a light source for two-dimensional scanning. Light from the specimen (e.g., a reflected light, a transmission light, fluorescence, etc. depending on the material and the shape of the specimen) is detected by a photodetector and the detected light is converted into an electric signal by a photoelectric transducer. The converted electric signal is converted into digital image data by an A/D converter and stored in a conventional memory. An image based on the stored image data is generated and displayed on a display unit of a computer.

SUMMARY OF THE INVENTION

Exemplary embodiments of the present invention include exemplary scanning optical microscopes that include a long working-distance, infinity-corrected objective lens.

An exemplary embodiment of the present invention is a scanning optical microscope, including: a light source to generate a beam of probe light; collimation optics to substantially collimate the beam of probe light; a probe-result beamsplitter; a long working-distance, infinity-corrected objective; scanning means to scan a beam spot of the focused probe beam on or within a sample; relay optics; and a detector. The collimation optics are disposed in the optical path of the beam of probe light. The probe-result beamsplitter is arranged: in the optical path of the beam of probe light and in an optical path of resultant light from the sample, which is illuminated by the probe light. The beamsplitter reflects at least a portion of the substantially collimated beam of probe light into the long working-distance, infinity-corrected objective and transmits at least a portion of the resultant light. The long working-distance, infinity-corrected objective is also arranged in both the optical path of the beam of probe light and in the optical path of resultant light. The long working-distance, infinity-corrected objective focuses the reflected portion of the beam of probe light onto the sample, and collects and substantially collimates the resultant light. The relay optics are arranged in the optical path of resultant light from the sample to relay the transmitted resultant light from the beamsplitter to the detector.

Another exemplary embodiment of the present invention is a scanning optical microscope, including: a light source to generate a beam of probe light; collimation optics to substantially collimate the beam of probe light; a probe-result beamsplitter; a long working-distance, infinity-corrected objective; scanning means to scan a beam spot of the focused probe beam on or within a sample; relay optics; and a detector. The collimation optics are disposed in the optical path of the beam of probe light. The probe-result beamsplitter is arranged: in the optical path of the beam of probe light and in an optical path of resultant light from the sample, which is illuminated by the probe light. The beamsplitter transmits at least a portion of the substantially collimated beam of probe light into the long working-distance, infinity-corrected objective and reflects at least a portion of the resultant light. The long working-distance, infinity-corrected objective is also arranged in both the optical path of the beam of probe light and in the optical path of resultant light. The long working-distance, infinity-corrected objective focuses the transmitted portion of the beam of probe light onto the sample, and collects and substantially collimates the resultant light. The relay optics are arranged in the optical path of resultant light from the sample to relay the reflected resultant light from the beamsplitter to the detector.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawing are the following figures.

DETAILED DESCRIPTION OF THE INVENTION

Figure 1:
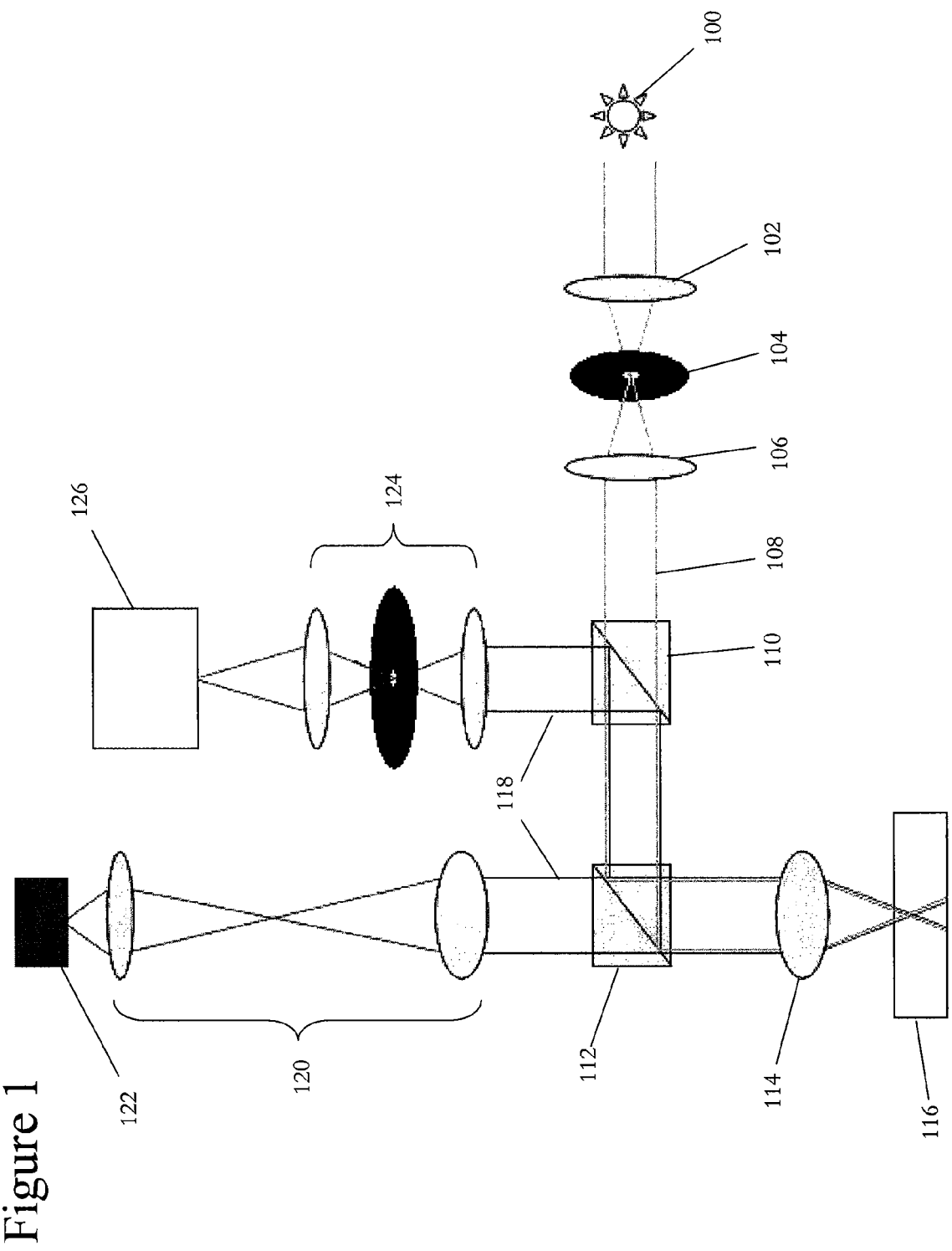
FIG. 1 is a side plan drawing illustrating an exemplary scanning optical microscope configuration that includes a long working-distance, infinity-corrected objective lens according to the present invention.

The exemplary embodiments of the present invention involve the integration of long working distance infinity-corrected microscope objectives in scanning optical microscope systems, instead of standard objectives. To accomplish this integration, it is desirable for the imaging path to be corrected to allow the combination of the optical path of the laser illumination source with the optical path of the light resulting from the illumination of the sample with the probe light (i.e. the resultant light). The use of long working-distance, infinity-corrected microscope objectives may enable multiple new applications, as described below.

For example, the use of long working-distance, infinity-corrected objectives may allow scanning optical microscopes according to the present invention to perform laser analyses on samples mounted in standard environmental chambers (hot, cold, high-pressure, fluidic or electrochemistry chambers), rather than requiring specially designed environmental chambers with reduced depths, as are necessary in systems using shorter working-distance microscope objectives. This may also significantly increase the maximum spatial resolution at which such measurements may be performed inside an environmental chamber.

Although long working-distance, infinity-corrected objectives may provide a number of advantages in scanning microscopy uses, where pixel size of the resulting images is affected by the scan speed and sampling rate, it is noted that microscopy system including such lenses may have reduced image clarity for stationary (i.e. non-scanning) images taken with focal plane arrays and may exhibit reduced depth resolution as well.

Exemplary embodiments of the present invention include an optical microscopy system with integrated laser-microscopy capability to study materials and devices in controlled environments. This exemplary system includes a high-resolution compound microscope with integrated optical ports to allow optical coupling of a light source for in-situ sample excitation and characterization. This exemplary optical microscopy system also includes a long working distance infinity-corrected microscope objective. The use of standard microscope objectives may impose significant restrictions on the geometries of environmental chambers used with these systems, which may require the use of expensive customized chambers with such systems. These geometric restrictions may also significantly limit the maximum spatial resolution with which such measurements may be performed. Therefore, exemplary systems according to the present invention may provide users with unparalleled flexibility, which may make these systems a major asset for multiple research & development applications.

In addition to using long working distance infinity-corrected microscope objectives, the optical ports of exemplary scanning optical microscopes according to the present invention may be configured to have "straight" or "confocal" configurations for high-throughput spectroscopy or high-resolution imaging applications. Various properties of the sample may be imaged with a sub-micrometer spatial resolution. Numerous measurements such as resonant- and dispersive-Raman, luminescence, vibrational, photocurrent, scattering, non-linear optical (NLO), and time-resolved spectroscopy measurements can be performed using these configurable ports.

Further, it is contemplated that, in addition to imaging, luminescence, laser-microscopy & spectroscopy applications, the principles of exemplary embodiments of the present invention may also be used for high-precision laser-writing applications such as lithography, marking & cutting and for laser manipulation or "optical tweezer" applications.

FIG. 1 illustrates an exemplary scanning optical microscope according to the present invention. This exemplary scanning optical microscope includes: light source 100; collimation optics (lenses 102 and 106 and pinhole 104); beamsplitters 110 and 112 to separate collimated beam 108 of probe light from resultant light 118; long working-distance, infinity-corrected objective 114; detectors 122 and 126; and various optics (elements 120 and 124) to relay resultant light 118 to the detectors.

Exemplary scanning optical microscopes according to the present invention also include scanning means to scan a beam spot of the focused probe beam on or within the sample. These scanning means may include X-Y translation stages coupled to the sample to provide relative motion of the sample in directions substantially perpendicular to the optical paths of the probe beam and the resultant light. Relative motion in the direction parallel to these optical paths may be provided by a Z-translation stage that is also coupled to the sample. Alternatively, because of the fact that the incoming beam of probe light and the outgoing resultant light are substantially collimated, the beam spot moves in unison the long working-distance, infinity-corrected objective. Therefore, the Z-translation stage may instead be coupled to the long working-distance, infinity-corrected objective without any need for correction.

Figure 2:
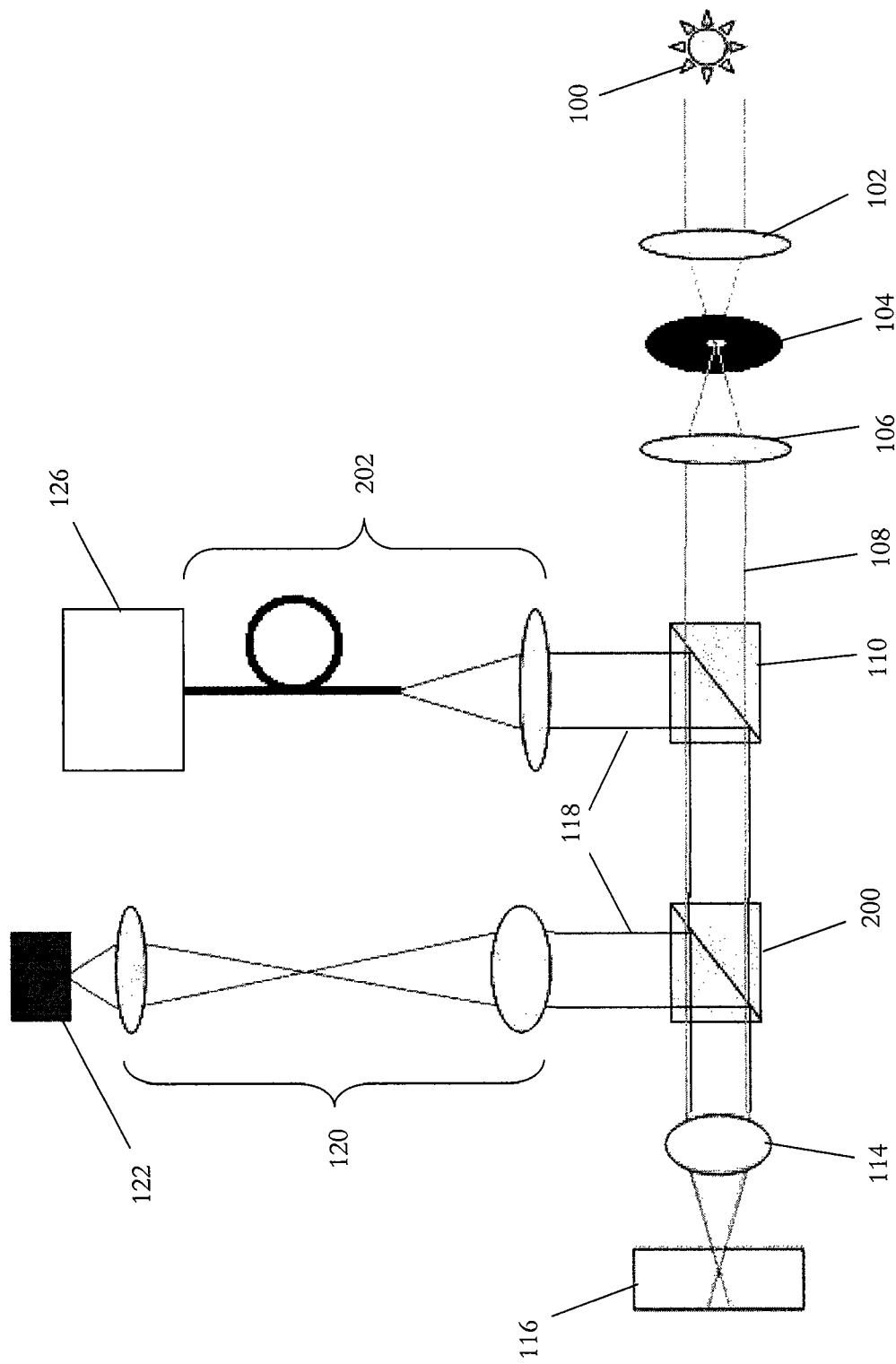
FIG. 2 is a side plan drawing illustrating another exemplary scanning optical microscope configuration that includes a long working-distance, infinity-corrected objective lens according to the present invention.
Figure 3A:
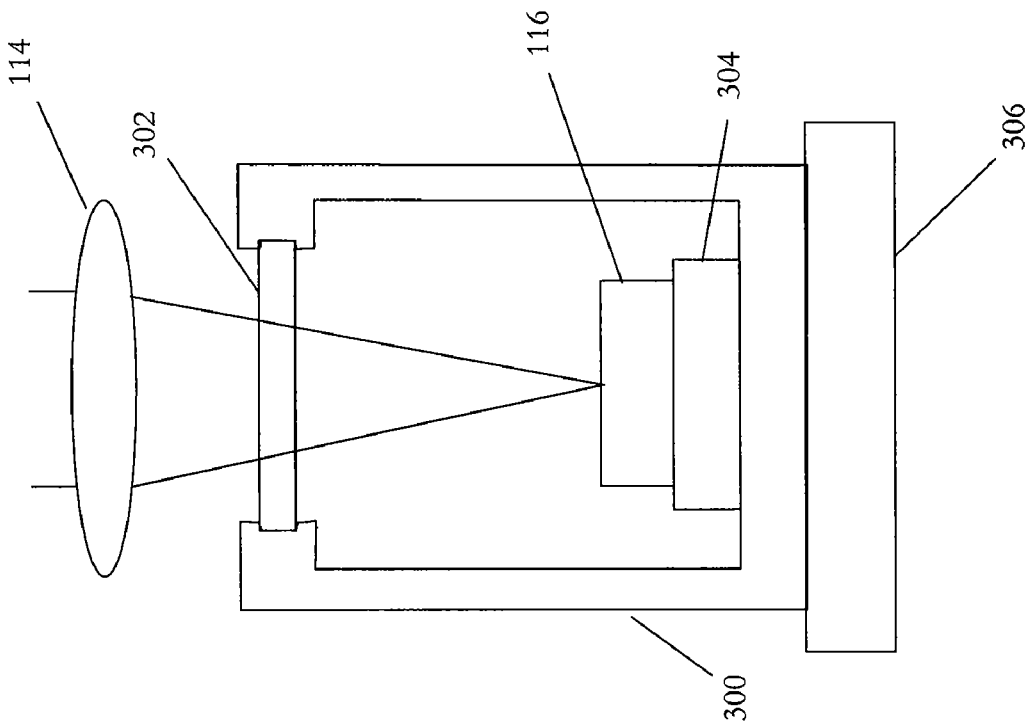
FIGS. 3A, 3B, and 3C are side plan drawings illustrating exemplary configurations of environmental chamber and scanning means that may be used with exemplary scanning optical microscope according to the present invention.
Figure 3B:
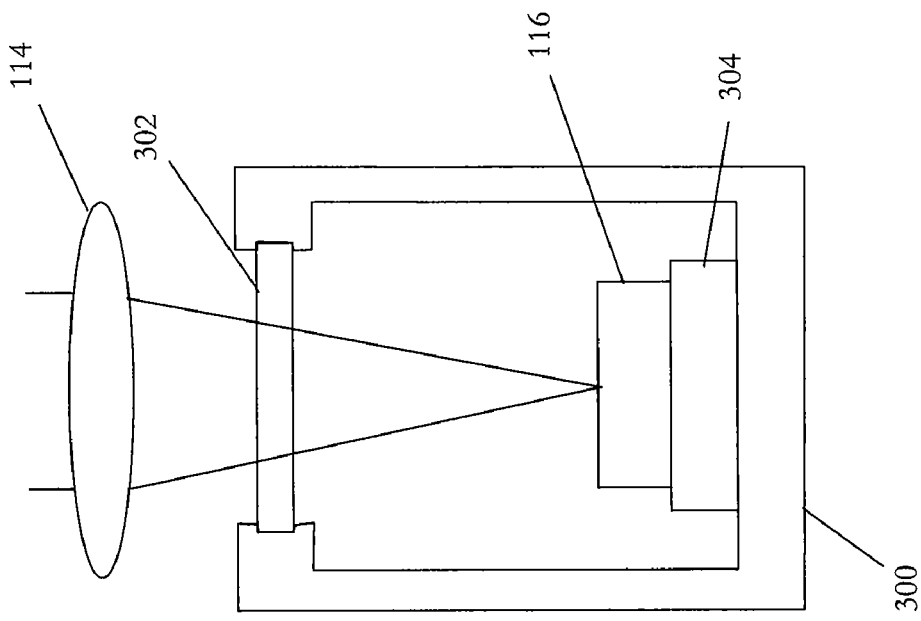
Figure 3C:
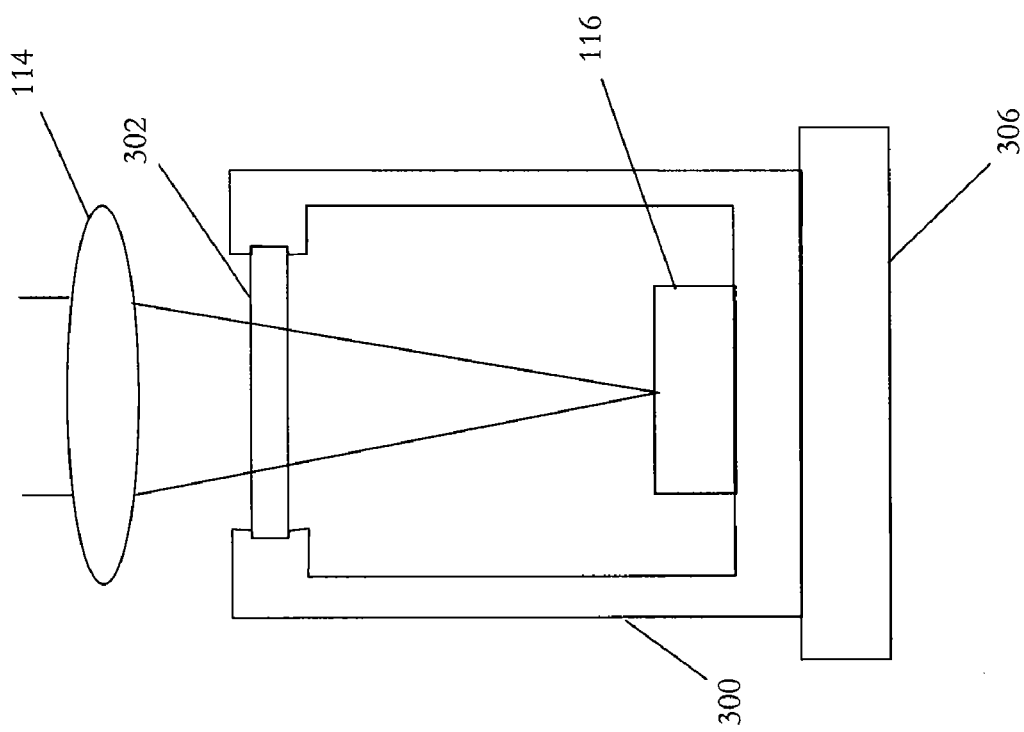

To simplify the illustrations of FIGS. 1 and 2, the scanning means are not shown in these Figures. FIGS. 3A-C illustrate three exemplary scanning means and how they may be incorporated with the exemplary systems of FIGS. 1 and 2, as well as with exemplary environmental chambers.

Light source 100 generates a beam of probe light. This beam of probe light may be provided via various laser or other light sources that emit light with a peak wavelength in the desired range. The desired wavelength range may depend on the type of characterization to be performed; however, typical operation may occur from the near-ultraviolet to the near infrared (300-1700 nm). One skilled in the art will understand that the optical elements of the microscope system should be selected to have the desired optical properties in the wavelength range to be used. In some cases, this may mean that it will be desirable to change some optical elements when changing the wavelength band of light source 100. Optical elements that are most likely to be exchanged in this manner may be mounted on translation slides or rotary mounts similar to those often used for microscope objectives to facilitate quick changes.

The collimation optics are disposed in the optical path of the beam of probe light to substantially collimate the beam of probe light. Unlike a conventional scanning optical microscope, it is desirable for the beam of probe light to be collimated. This is because of the use of long working-distance, infinity-corrected objective 114.

FIGS. 1 and 2 include exemplary collimation optics that include two lenses 102 and 106 and pinhole 104; however, one skilled in the art will understand that other collimation optics may be used. It is noted that these collimation optics may be included in light source 100, so that the beam of probe light generated by light source 100 is collimated.

Beamsplitter 110 is arranged in the optical path of the beam of probe light so that it may transmit at least a portion of substantially collimated beam 108 of the probe light. This portion of substantially collimated beam 108 of the probe light is incident on beamsplitter 112 which is arranged in the optical path of the beam of probe light so that it reflects at least a portion of substantially collimated beam 108 of probe light into long working-distance, infinity-corrected objective 114.

Long working-distance, infinity-corrected objective 114 is arranged in the optical path of the beam of probe light to focus the portion of substantially collimated beam 108 of probe light reflected by beamsplitter 112 onto sample 116. The probe light may be focused on the surface of the sample or may be focused inside of the sample. Depending on the interaction between the probe light and the sample, various types of light may result. Such resultant light may include reflected light, scattered light (including Raman shifted light), and fluorescent light among others. At least a portion of this resultant light is collected by long working-distance, infinity-corrected objective 114 and directed as a substantially collimated beam along an optical path coincident with the optical path of the beam of probe light (but in the opposite direction).

Thus, beamsplitter 112 is also arranged in the optical path of resultant light 118. Beamsplitter 112 desirably transmits at least a portion of the resultant light as shown in FIG. 1. This portion of the resultant light is relayed by optics 120 into detector 122. Beamsplitter 112 may also reflect a portion of the resultant light as shown in FIG. 1. This portion of the resultant light is incident on beamsplitter 110 which reflects at least a portion of this resultant light. This portion is relayed by optics 124 into detector 126.

It is noted that the exemplary system of FIG. 1 includes two beamsplitters to separate resultant light 118 into two portions that are directed to different detectors so that two different experiments may be performed simultaneously. In this exemplary configuration, relay optics 120 are illustrated to be in a 'straight' configuration, while relay optics 124 are illustrated to be in a 'confocal' configuration. FIG. 2 includes alternative relay optics 202, with an optical fiber. One skilled in the art will understand that these configurations are illustrative and are not intended to be limiting. The relay optics may include various optical elements such as: lenses; filters; reflectors; diffractive optical elements; beamsplitters; optical fibers; and planar waveguides.

Further, it is contemplated that additional beamsplitters may be added, possibly as part of the relay optics, to allow the resultant light to be further divided and for additional experiments to be run in parallel. It is also contemplated that additional beamsplitters may be used to couple in additional parallel beams of probe light, allowing experiments, such as time-resolved photochemical analyses, that require multiple wavelength bands and/or separate excitation and probe pulses of light. It is noted that, because of the fact that the beam of probe light and the resultant light are substantially collimated in this section of the exemplary scanning optical microscope, these additional beamsplitters (and associated input and output ports) may be easily added to the exemplary system.

FIG. 2 illustrates an alternative configuration of the beamsplitter in which beamsplitter 112 is replaced with beamsplitter 200 that it arranged similarly to beamsplitter 110, i.e. transmitting the probe light. Other configurations include ones in which a beamsplitter may be arranged to be in the optical path of resultant light 118 only. For example, a beamsplitter could be introduced between beamsplitter 112 and relay optics 120 in the exemplary system of FIG. 1.

One or more of these beamsplitters may be dichroic, thereby allowing different wavelength bands of resultant light to be directed in different directions (i.e. reflected or transmitted). For example, a dichroic beamsplitter may be used to separate a portion of the resultant light that has had its spectrum shifted, such as Raman scattered light or fluorescent light, from other resultant light that is merely reflected probe light and, thus, unshifted.

The selection and configuration of the beamsplitters and the relay optics may depend on the types of experiments to be conducted. Similarly, the detector(s) used may be dependent on the type of experiments to be conducted, as well as the wavelength bands and anticipated intensities of the resultant light. One skilled in the art will be aware of many different types of optical detectors that may be used with exemplary embodiments of the present invention, including (but not limited to): photodetectors; spectrometers; bolometers; and focal plane arrays.

Scanning optical microscopy techniques may provide useful fundamental information on the opto-electro-mechanical, chemical, or biological properties of a given material. By using long working-distance, infinity-corrected objectives, exemplary systems according to the present invention may allow measurement of these properties directly for numerous soft-materials (e.g., cells, etc.) as well as solid-state materials and devices in controlled environments that may be difficult or impossible to perform using prior art scanning laser microscope systems. For example, experiments may be performed using standard temperature controlled environmental chambers throughout a temperature range of 4-1750 K with exemplary scanning optical microscopes according to the present invention. More specifically, these exemplary systems may be used to investigate the unique properties of semiconductor, metallic and carbon-based micro- and nano-structures, so as to controllably improve their fabrication processes and device properties. Moreover, these exemplary systems may also be used for bio-sensing applications and to perform tissue, cell and protein characterization using laser-microscopy techniques. They may also be able to be used for laser-based micro-lithography applications in controlled environments.

FIGS. 3A-C illustrate exemplary approaches to using exemplary systems of the present invention with environmental chambers 300. In these examples, environmental chamber 300 surrounds sample 116 so that predetermined environmental conditions may be maintained during testing. Exemplary environmental chambers that may be used include: high temperature environmental chambers; cryogenic environmental chambers; barometric chambers (both high pressure and vacuum); fluidic chambers (for gases or liquids); gas discharge chambers (to allow optical analysis of plasmas); blast chambers; and electrochemistry chambers.

Environmental chamber 300 includes window 302 through which probe light from long working-distance, infinity-corrected objective 114 is substantially transmitted, as shown in FIGS. 3A-C. Window 302 is also desirably substantially transmissive to the resultant light.

Due to the long working-distance of this objective it is possible for the window to be thicker than it could be with shorter working-distance objective, which may be particularly important for environmental chambers such as barometric chambers and blast chambers. Additionally, it may allow for greater distance between window 302 and sample 116, which may be particularly useful for environmental chambers such as cryogenic chambers.

FIGS. 3A-C also illustrate exemplary ways in which the scanning means may be incorporated in exemplary systems that include environmental chambers. In FIG. 3A, the scanning means includes translation stage 304 which is directly coupled to sample 116 inside of environmental chamber 300. Translation stage 304 may be an X-Y translation stage and Z motion may be controlled by a Z translation stage coupled to long working-distance, infinity-corrected objective 114. Alternatively, translation stage 304 may be include X, Y, and Z translation stages.

FIG. 3B illustrates an exemplary scanning means that includes translation stage 304 which is directly coupled to sample 116 inside of environmental chamber 300 and translation stage 306 that is outside of environmental chamber 300. Each of these translation stages control motion in one or two dimensions. If each of translation stages 304 and 306 controls motion in only one dimension, a Z translation stage may also be coupled to long working-distance, infinity-corrected objective 114.

FIG. 3C illustrates an exemplary scanning means that is similar to the configuration of FIG. 3A, except that it includes translation stage 306 outside of environmental chamber 300 and no translation stages inside of environmental chamber 300. Such a configuration may be particularly useful if the environment inside of the environmental chamber would be deleterious to a translation stage, or if electrical isolation is desired. Additionally, this configuration may be desirable in an exemplary system design to use the environmental chamber for some experiments and not to use the environmental chamber for other experiments (or to use multiple environmental chambers for different experiments).

The present invention includes a number of exemplary scanning optical microscope systems. Although the invention is illustrated and described herein with reference to specific embodiments, it is not intended to be limited to the details shown. Rather, various modifications may be made in the details within the scope and range of equivalents of the claims and without departing from the invention.

What is claimed is:

1. A scanning optical microscope, comprising:
   a light source to generate a beam of probe light;
   collimation optics disposed in an optical path of the beam of probe light to substantially collimate the beam of probe light;
   a probe-result beamsplitter arranged:
      in the optical path of the beam of probe light to reflect at least a portion of the substantially collimated beam of probe light into a long working-distance, infinity-corrected objective; and
      in an optical path of resultant light from a sample illuminated by the probe light to transmit at least a portion of the resultant light, the probe-result beamsplitter substantially reflects a reflected portion of the resultant light substantially collimated by the long working-distance, infinity-corrected objective and transmits a transmitted portion of the resultant light substantially collimated by the long working-distance, infinity-corrected objective;
   the long working-distance, infinity-corrected objective arranged:
      in the optical path of the beam of probe light to focus the reflected portion of the beam of probe light onto the sample; and
      in the optical path of resultant light from the sample to collect and substantially collimate the resultant light;
   scanning means to scan a beam spot of the focused beam of probe light on or within the sample;
   relay optics arranged in the optical path of resultant light from the sample to relay the transmitted portion of the resultant light from the beamsplitter to a detector including a first detection element and a second detection element, the relay optics include optical elements arranged in the optical path of the transmitted portion of the resultant light such that the transmitted portion of the resultant light is incident on the first detection element and the relay optics include a relay beamsplitter arranged in the optical path of the reflected portion of the resultant light such that at least a portion of the reflected portion of the resultant light is reflected by the relay beamsplitter and is incident on the second detection element; and
   the detector.

2. A scanning optical microscope according to claim 1, wherein the light source is a laser source.

3. A scanning optical microscope according to claim 2, wherein the probe-result beamsplitter is a dichroic beamsplitter adapted to substantially reflect a band of wavelengths that includes a peak wavelength of the beam of probe light.

4. A scanning optical microscope according to claim 1, wherein the collimation optics include:
   a pinhole;
   a first lens to focus the probe light on the pinhole; and
   a second lens to substantially collimate probe light that passes through the pinhole.

5. A scanning optical microscope according to claim 4, wherein:
   the scanning optical microscope is a confocal scanning optical microscope; and
   the relay optics include:
      another pinhole;
      a third lens to focus the portion of the resultant light transmitted by the probe-result beamsplitter on the other pinhole; and
      a fourth lens to focus the resultant light that passes through the other pinhole on the detector.

6. A scanning optical microscope according to claim 1, wherein the scanning means includes an X-Y translation stage coupled to the sample.

7. A scanning optical microscope according to claim 6, wherein the scanning means further includes a Z translation stage coupled to the sample.

8. A scanning optical microscope according to claim 6, wherein the scanning means further includes a Z translation stage coupled to the long working-distance, infinity-corrected objective.

9. A scanning optical microscope according to claim 1, wherein the relay optics include at least one of a lens, a filter, a reflector, a diffractive optical element, a beamsplitter, an optical fiber, or a planar waveguide.

10. A scanning optical microscope according to claim 1, wherein:
    the detector includes a first detection element and a second detection element; and
    the relay optics include a relay beamsplitter arranged in the optical path of the resultant light such that:
       a first sub-portion of the resultant light transmitted by the probe-result beamsplitter is transmitted by the relay beamsplitter and is incident on the first detection element; and
       a second sub-portion of the resultant light transmitted by the probe-result beamsplitter is reflected by the relay beamsplitter and is incident on the second detection element.

11. A scanning optical microscope according to claim 1, wherein the detector includes at least one of: a photodetector; a spectrometer; a bolometer; or a focal plane array.

12. A scanning optical microscope according to claim 1, further comprising an environmental chamber surrounding the sample, the environmental chamber including a window which is substantially transmissive to:
    the focused beam of probe light; and
    the resultant light to be collected by the long working-distance, infinity-corrected objective.

13. A scanning optical microscope according to claim 12, wherein the environmental chamber further surrounds at least one of:
    an X-Y translation stage of the scanning means, the X-Y translation stage being coupled to the sample; or
    a Z translation stage of the scanning means, the Z translation stage being coupled to the sample.

14. A scanning optical microscope according to claim 13, wherein the environmental chamber is coupled to at least one of:
    an X-Y translation stage of the scanning means; or
    a Z translation stage of the scanning means.

15. A scanning optical microscope according to claim 12, wherein the environmental chamber is at least one of:
    a high temperature environmental chamber;
    a cryogenic environmental chamber;
    a barometric chamber;
    a fluidic chamber;
    a gas discharge chamber;
    a blast chamber; or
    an electrochemistry chamber.

16. A scanning optical microscope, comprising:
a light source to generate a beam of probe light;
collimation optics disposed in an optical path of the beam of probe light to substantially collimate the beam of probe light;
a probe-result beamsplitter arranged:
- in the optical path of the beam of probe light to transmit at least a portion of the substantially collimated beam of probe light into a long working-distance, infinity-corrected objective; and
- in an optical path of resultant light from a sample illuminated by the probe light to reflect at least a portion of the resultant light;

the long working-distance, infinity-corrected objective arranged:
- in the optical path of the beam of probe light to focus the transmitted portion of the beam of probe light onto the sample; and
- in the optical path of resultant light from the sample to collect and substantially collimate the resultant light;

scanning means to scan a beam spot of the focused beam of probe light on or within the sample;
relay optics arranged in the optical path of resultant light from the sample to relay the reflected portion of the resultant light from the beamsplitter to a detector including a first detection element and a second detection element, the relay optics include a relay beamsplitter arranged in the optical path of the resultant light such that a first sub-portion of the resultant light reflected by the probe-result beamsplitter is transmitted by the relay beamsplitter and is incident on the first detection element and a second sub-portion of the resultant light reflected by the probe-result beamsplitter is reflected by the relay beamsplitter and is incident on the second detection element; and
the detector.

17. A scanning optical microscope according to claim 16, wherein the light source is a laser source.

18. A scanning optical microscope according to claim 17, wherein the probe-result beamsplitter is a dichroic beamsplitter adapted to substantially reflect a band of wavelengths that includes a peak wavelength of the beam of probe light.

19. A scanning optical microscope according to claim 16, wherein the collimation optics include:
a pinhole;
a first lens to focus the probe light on the pinhole; and
a second lens to substantially collimate probe light that passes through the pinhole.

20. A scanning optical microscope according to claim 19, wherein:
the scanning optical microscope is a confocal scanning optical microscope; and
the relay optics include:
another pinhole;
a third lens to focus the portion of the resultant light reflected by the probe-result beamsplitter on the other pinhole; and
a fourth lens to focus the resultant light that passes through the other pinhole on the detector.

21. A scanning optical microscope according to claim 16, wherein the scanning means includes an X-Y translation stage coupled to the sample.

22. A scanning optical microscope according to claim 21, wherein the scanning means further includes a Z translation stage coupled to the sample.

23. A scanning optical microscope according to claim 21, wherein the scanning means further includes a Z translation stage coupled to the long working-distance, infinity-corrected objective.

24. A scanning optical microscope according to claim 16, wherein the relay optics include at least one of a free-space optical element, an optical fiber, or a planar waveguide.

25. A scanning optical microscope according to claim 16, wherein the detector includes at least one of: a photodetector; a spectrometer; a bolometer; or a focal plane array.

26. A scanning optical microscope according to claim 16, further comprising an environmental chamber surrounding the sample, the environmental chamber including a window which is substantially transmissive to:
the focused beam of probe light; and
the resultant light to be collected by the long working-distance, infinity-corrected objective.

27. A scanning optical microscope according to claim 26, wherein the environmental chamber further surrounds at least one of:
an X-Y translation stage of the scanning means, the X-Y translation stage being coupled to the sample; or
a Z translation stage of the scanning means, the Z translation stage being coupled to the sample.

28. A scanning optical microscope according to claim 26, wherein the environmental chamber is coupled to at least one of:
an X-Y translation stage of the scanning means; or
a Z translation stage of the scanning means.

29. A scanning optical microscope according to claim 26, wherein the environmental chamber is at least one of:
a high temperature environmental chamber;
a cryogenic environmental chamber;
a barometric chamber;
a fluidic chamber;
a gas discharge chamber;
a blast chamber; or
an electrochemistry chamber.

* * * * *

UNITED STATES PATENT AND TRADEMARK OFFICE
CERTIFICATE OF CORRECTION

| | |
|---|---|
| PATENT NO. | : 7,817,275 B2 |
| APPLICATION NO. | : 12/044370 |
| DATED | : October 19, 2010 |
| INVENTOR(S) | : Sylvain G. Cloutier |

It is certified that error appears in the above-identified patent and that said Letters Patent is hereby corrected as shown below:

In the Claims:

Column 8, line 53:

"14. A scanning optical microscope according to claim 13," should read --14. A scanning optical microscope according to claim 12,--.

Signed and Sealed this
Fourth Day of January, 2011

David J. Kappos
*Director of the United States Patent and Trademark Office*